Patented Mar. 10, 1942

2,276,173

UNITED STATES PATENT OFFICE 2,276,173

METHOD OF RECLAIMING WOOL

Carl S. Ferguson, Newton, Mass.

No Drawing. Application April 3, 1939,
Serial No. 265,768

7 Claims. (Cl. 8—140)

This invention relates to a method of reclaiming wool fibers by chemically destroying fibers of natural silk, cellulose acetate, rayon, cotton and other vegetable matter which may be mixed with wool, such removal being accomplished with no more deleterious effect on the wool fibers than results from the usual acid carbonizing treatment now in general use for destroying cotton and other vegetable matter mixed with wool.

In my co-pending application Serial No. 85,701, filed June 17, 1936, pursuant to which application Letters Patent of the United States No. 2,152,640 were granted to me on April 4, 1939, there is described a method of treating wool and silk mixtures for the removal of silk therefrom by immersing the fibers in a concentrated solution of zinc and calcium chlorides in stated proportions and at given temperatures, such treatment also resulting in the conditioning of any cellulose acetate fibers which may be present so that subsequent baking such as is done in the ordinary carbonizing processes will disintegrate the cellulose acetate fiber and permit its ready removal as dust.

According to the present invention, a small amount of aluminum chloride is added to the zinc-calcium chloride solution described in said application, and the resulting solution is used in the treatment of wool mixtures which may contain not only natural silk and cellulose acetate, but also cotton, rayon, and other vegetable matter such as burrs, bits of grass, wood and the like. Suitable treatment in such a solution not only dissolves out the silk and conditions the cellulose acetate for baking, but also softens the vegetable matter and saturates the same with chemicals which causes the destruction of such matter when subsequently baked. Since the zinc and calcium chlorides by themselves are not effective in preparing vegetable matter for baking, and since the small amount of aluminum chloride used would be ineffective for such purpose, it is believed that the aluminum chloride has a sort of trigger action in the solution and activates either the zinc chloride or calcium chloride, or both, so that their presence together in the vegetable matter during baking results in the destruction of such matter. Thus, a single liquid treatment, followed by drying and baking, will remove from wool mixtures any natural silk, cellulose acetate, rayon, cotton or other vegetable matter which may be present, with practically no deterioration of the wool itself, that is, no more than inevitably results from the customary carbonizing treatment generally employed for the removal of vegetable matter.

For practicing the invention, a suitable solution should be prepared by dissolving sufficient quantities of the chlorides of zinc, calcium and aluminum to make a concentrated solution having density of from 50° to 55° Bé. at room temperature. The salts may be introduced in any desired order, or all together. Considerable latitude in the ratio between the quantities of the individual salts in the solution is permissible, but there must be considerably less of the aluminum chloride present than of either of the other two chlorides. For best results, the ratio between the zinc chloride and calcium chloride should be between 7:3 and 3:7, sufficient aluminum chloride being added to make 3% to 6% in the final solution.

The following specific solution is recommended, but it is to be understood that the quantities and proportions of ingredients given are by way of example only and not limitation. To each gallon of water add eleven pounds of calcium chloride, seven pounds of zinc chloride, and one pound of aluminum chloride, and dissolve. The resulting solution will have a boiling point of 255° to 260° F. and a density of about 52° Bé. at 60° F. This solution is heated to a temperature of from 195° to 230° F., the rapidity of the action of the solution in dissolving silk depending on its temperature. About 215° F. is optimum. The fibers to be treated are then immersed in the hot solution and are agitated therein until the natural silk fibers are completely dissolved. This will ordinarily require from eight to fifteen minutes at temperatures within the range stated. The fibers may be in the form of piece goods, rags, clippings, picked stock, thread waste, or any other form sufficiently open and loose to permit free penetration and circulation of the solution. Since the stock when introduced into the bath is ordinarily at room temperatures, it will tend to cool the bath somewhat. For this reason it is preferable to apply heat to the solution when a batch of stock is introduced, so as to maintain the temperature close to the optimum. For the same reason also, agitation is important to prevent local cooling of the solution which penetrates to the interior of a mass of stock below the effective range of temperature, thus leaving a portion of the stock inadequately treated. While immersion of the stock during the liquid treatment is preferred as a simple effective method, it is to be understood that the invention includes other equivalent methods of liquid treatment such as spraying, or dipping the stock and suspending it in a heated atmosphere.

After the liquid treatment has been completed, the liquor is mechanically extracted as thoroughly as possible from the stock by squeeze rolls, centrifuges or other means which maintain the concentration of the recovered liquor. The stock is then dried, this step being hastened by any convenient drying apparatus in which the stock may be exposed to a current of air at a temperature of 180° to 190° F. The dried stock is then baked at a temperature of from 220° to 240° F. for a period of about 10 to 15 minutes or until the vegetable content of the stock has been destroyed and is ready to be dusted out. The resulting stock is free of natural silk, cellulose acetate, rayon, cotton, and other vegetable matter.

The stock is then thoroughly washed to remove the residual salts on the fibers from the liquor carried out from the treating bath. To this end five or six changes of water are employed, the first wash water being preferably slightly acidified with hydrochloric or acetic acid, and moderately hot. The washing is followed by a final drying.

The three chlorides employed in the solution are believed to function as follows. The zinc chloride is the active agent which dissolves the silk and conditions the cellulose acetate. The calcium chloride acts as a palliative to protect the wool fibers from being injured by the zinc chloride. As far as can be determined, these two chlorides have no appreciable effect on vegetable matter, either singly or together. Aluminum chloride in proper concentration on vegetable fibers appears to undergo a partial hydrolysis with the liberation of hydrochloric acid gas which can be amployed to attack the vegetable fibers and disintegrate them. A 3% to 6% solution of aluminum chloride, however, would be ineffective by itself as a carbonizing agent for vegetable matter. In the presence of larger quantities of zinc chloride and calcium chloride, however, the aluminum chloride appears to activate one or both of the other chlorides so that they together function as an efficient carbonizing agent.

I claim:

1. A method of removing natural silk and vegetable matter from a mixture containing wool, natural silk and vegetable matter, comprising treating the mixture with a hot concentrated solution of zinc chloride, calcium chloride and aluminum chloride to dissolve the silk, the zinc and calcium chlorides being in excess of the aluminum chloride, removing excess solution after treatment, drying and baking the mixture to disintegrate the vegetable matter, and washing the residue.

2. A method of removing natural silk and vegetable fibers from a mixture containing wool, natural silk and vegetable fibers, comprising treating the mixed fibers with a hot concentrated solution of zinc, calcium and aluminum chlorides to dissolve the silk, the calcium chloride being in excess of the zinc chloride, and the calcium and zinc chlorides both being greatly in excess of the aluminum chloride, mechanically extracting excess solution from the fibers after treatment, drying the fibers, baking the dried fibers to disintegrate the vegetable matter in the mixture, washing the residual fibers, and drying the washed fibers.

3. A method of removing natural silk and vegetable fibers from a mixture containing wool, natural silk and vegetable fibers, comprising treating the mixed fibers with a hot concentrated solution of zinc chloride and calcium chloride containing 3% to 6% aluminum chloride to dissolve the silk, mechanically extracting excess solution from the fibers after treatment, drying the fibers, baking the dried fibers at a temperature between 220° to 240° F., whereby the vegetable matter therein is disintegrated, washing the residual fibers in water, and drying the washed fibers.

4. A method of reclaiming wool fibers from mixtures containing wool, natural silk and vegetable matter, comprising immersing the mixture in a bath of concentrated solution of zinc, calcium and aluminum chlorides in the approximate ratio of 7:11:1 while maintaining the bath at a temperature between 195° and 230° F., mechanically extracting excess solution from the residual fiber mixture after the natural silk has dissolved, drying and baking the fibers at temperatures between 220° and 240° F. to disintegrate the vegetable matter, and washing and drying the residue.

5. A method of reclaiming wool fibers from mixtures containing wool and cellulose acetate fibers, which comprises treating the mixed fibers with a hot solution of zinc, calcium and aluminum chlorides, the zinc and calcium chlorides being greatly in excess of the aluminum chloride, removing excess solution from the fibers, drying the fibers, baking the dried fibers at a temperature of from 220° to 240° F., and washing the residue.

6. A method of reclaiming wool fibers from mixtures containing wool and cellulose acetate fibers, which comprises treating the mixed fibers with a hot solution of zinc chloride, calcium chloride and aluminum chloride in the approximate ratio of 7:11:1, removing excess solution after treatment, drying, baking the dried fibers at a temperature between 220° and 240° F., and washing the residue.

7. A method of reclaiming wool fibers from mixtures containing wool, natural silk and cellulose acetate fibers, which comprises treating the mixed fibers with a solution of zinc chloride, calcium chloride and aluminum chloride in the approximate ratio of 7:11:1, the temperature of the solution being near but below its boiling point, removing excess solution from the fibers after treatment, drying the fibers, baking the dried fibers at a temperature between 220° and 240° F., and washing the residue.

CARL S. FERGUSON.